(12) United States Patent
Han et al.

(10) Patent No.: US 12,039,845 B2
(45) Date of Patent: Jul. 16, 2024

(54) DEVICE FOR CHECKING FIELD OF VIEW OF SURVEILLANCE CAMERA FOR ON-SITE WORK

(71) Applicant: ITU INC., Daejeon (KR)

(72) Inventors: Sung Wook Han, Daejeon (KR); Na Young Lee, Daejeon (KR)

(73) Assignee: ITU INC., Daejeon (KR)

( * ) Notice: Subject to any disclaimer, the term of this patent is extended or adjusted under 35 U.S.C. 154(b) by 113 days.

(21) Appl. No.: 17/990,083

(22) Filed: Nov. 18, 2022

(65) Prior Publication Data

US 2024/0153367 A1 May 9, 2024

(30) Foreign Application Priority Data

Nov. 3, 2022 (KR) .................. 10-2022-0145201

(51) Int. Cl.
| | | |
|---|---|---|
| *G08B 13/196* | (2006.01) | |
| *H04K 3/00* | (2006.01) | |
| *H04N 7/18* | (2006.01) | |
| *H04N 25/40* | (2023.01) | |

(52) U.S. Cl.
CPC . *G08B 13/19619* (2013.01); *G08B 13/19608* (2013.01); *G08B 13/19626* (2013.01); *H04K 3/822* (2013.01); *H04N 25/41* (2023.01); *H04N 7/188* (2013.01)

(58) Field of Classification Search
CPC ........ G08B 13/19619; G08B 13/19608; G08B 13/19626; H04K 3/822; H04N 25/41; H04N 7/188
See application file for complete search history.

(56) References Cited

U.S. PATENT DOCUMENTS

| | | | | |
|---|---|---|---|---|
| 8,508,595 | B2 * | 8/2013 | An ..................... | H04N 7/181 348/211.6 |
| 2011/0026007 | A1 * | 2/2011 | Gammenthaler ....... | G01S 17/89 356/28 |
| 2014/0092242 | A1 * | 4/2014 | Krishnan ............... | H04N 7/181 348/143 |
| 2014/0197314 | A1 * | 7/2014 | Afrooze ................ | H04N 5/141 250/495.1 |
| 2016/0245919 | A1 * | 8/2016 | Kalscheur ............ | G01S 7/4817 |
| 2020/0084439 | A1 * | 3/2020 | Tang .................... | G01S 17/86 |

FOREIGN PATENT DOCUMENTS

KR 10-0909073 B1 7/2009

\* cited by examiner

*Primary Examiner* — Padma Haliyur
(74) *Attorney, Agent, or Firm* — You & IP, LLC (57) ABSTRACT

Disclosed is a device for checking a field of view of a surveillance camera for on-site work, which rapidly and accurately checks a field of view in a field through a projection image without checking a filmed image through a monitor, is capable of installing the surveillance camera and adjusting a position of the surveillance camera, and is capable of outputting a visual warning according to a linkage with various image surveillance systems.

3 Claims, 7 Drawing Sheets

DEVICE FOR CHECKING FIELD OF VIEW OF SURVEILLANCE CAMERA FOR ON-SITE WORK

BACKGROUND OF THE INVENTION

Field of the Invention

The present invention relates to a technology related to a surveillance camera such as a CCTV, and more particularly to a device for checking a field of view of a surveillance camera for on-site work, which rapidly and accurately checks a field of view in a field through a projection image without checking a filmed image through a monitor, is capable of installing the surveillance camera and adjusting a position of the surveillance camera, and is capable of outputting a visual warning according to linkage with various image surveillance systems.

Description of the Related Art

CCTVs have traditionally been installed inside and outside various facilities that require security and used for access control or crime prevention purposes. In recent years, use thereof has been rapidly increasing for prevention and tracking of various crimes, as well as for protection and monitoring of people or objects.

Such a CCTV system includes a CCTV camera for filming a specific place and a monitor installed at a remote location and connected to the CCTV camera through a wired/wireless network, and an image filmed by the CCTV camera is transmitted to the remote monitor through the network.

In other words, since the camera and the monitor that outputs the image are generally relatively far apart, an operator who installs the camera at the site cannot check an exact field of view. Therefore, in practice, a direction of the camera is adjusted while communicating with another operator in a place where the monitor is located by radio, etc.

When the CCTV camera is a PTZ camera having pan/tilt/zoom functions, the operator located in front of the monitor may control the field of view without an accurate installation. However, since filming is usually performed in a fixed direction for reasons such as operating cost and efficiency, material and time waste of field installation operators continue. In particular, even after difficult installation, when a filming direction is unintentionally shifted due to external contact or adjustment of the field of view due to indoor/outdoor construction, there is a problem of the same difficulty as that during installation to correct the shift.
Patent Literature: Republic of Korea Patent No. 10-0909073 (Jul. 16, 2009)

SUMMARY OF THE INVENTION

Therefore, the present invention has been made in view of the above problems, and it is an object of the present invention to provide a device for checking a field of view of a surveillance camera for on-site work, which rapidly and accurately checks a field of view through a projection image formed in a filming spot without checking a filmed image through a monitor, is capable of installing the surveillance camera and adjusting a position of the surveillance camera, and is capable of outputting a visual warning according to a linkage with various image surveillance systems.

In accordance with the present invention, the above and other objects can be accomplished by the provision of a device for checking a field of view of a surveillance camera, the device including a first laser generation module configured to generate spot laser light through an LED that emits light in a set wavelength band, an optical module including a diffusion plate configured to diffuse the spot laser light and a main optical system configured to generate a rectangular projection image by combining lenticular lenses, each of which converts diffuse laser light into linear laser light, in a rectangular frame shape, the optical module outputting the projection image in a filming direction of the surveillance camera, a driving module including a motor and a driving system configured to adjust a distance between the first laser generation module and the optical module and adjust a size of the projection image by driving the motor, and a control module configured to control the first laser generation module and the motor in response to an angle of view of the surveillance camera, and to make the field of view of the surveillance camera coincide with a location and a size of the projection image.

The device may further include an image analysis module including an extraction unit configured to analyze an image filmed by the surveillance camera, and to extract a projection image from the image, and an adjustment unit configured to adjust a size of the extracted projection image to fit to an edge of the filmed image in conjunction with the control module.

The first laser generation module may further include a plurality of laser generation units to which color filters of set colors are applied and LEDs emitting light in different wavelength bands are applied, and a conversion unit configured to move the laser generation units within a set range and convert a color of emitted light.

The device may further include a second laser generation module configured to generate spot laser light through an LED that emits light in a set wavelength band, in which the optical module may further include an auxiliary optical system configured to change laser light of the second laser generation module to an optical image of a set pattern, and to output the image within the field of view of the surveillance camera.

The device may further include a facility monitoring module including an information management unit in which facility information including a type and standard of a facility to be monitored is stored, an analysis unit configured to analyze an image of the surveillance camera to identify a moving object and to track a location and a movement path in real time, a determination unit configured to calculate a size of the moving object and to generate collision prediction information based on the facility information and the movement path, and an alarm unit configured to reflect a determination result of the determination unit and to output an optical image of a pattern set through the auxiliary optical system to an outside of a facility.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a detailed description will be given of a structure of a device for checking a field of view of a surveillance camera for on-site work of the present invention with reference to the accompanying drawings.

Figure 1:
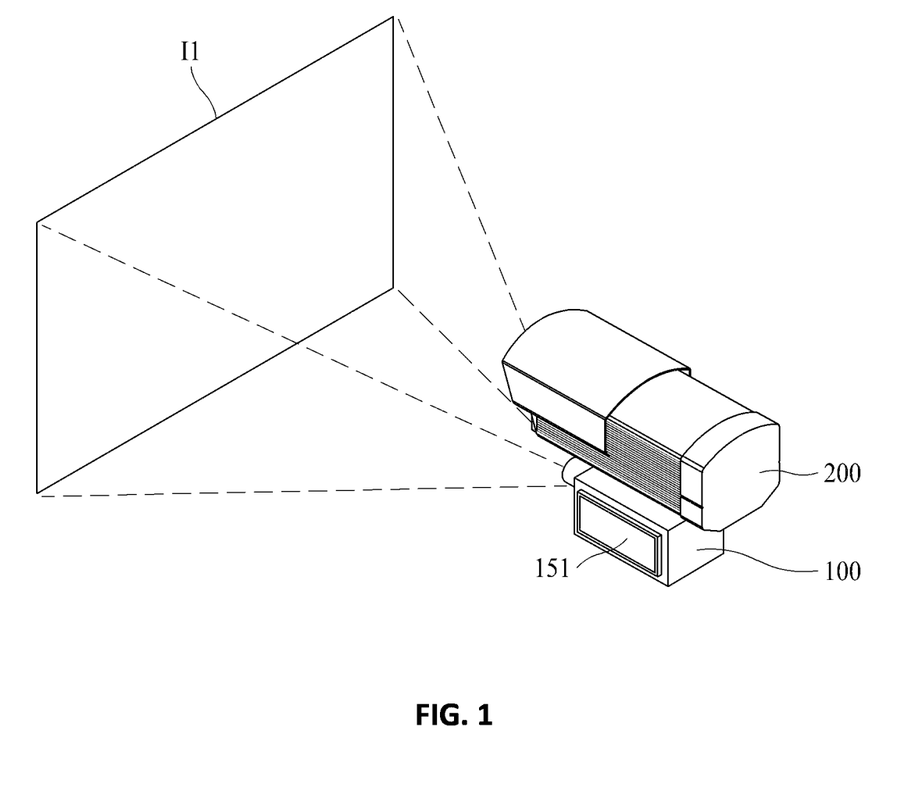
FIG. 1 is a basic conceptual diagram of the present invention.

FIG. 1 is a basic conceptual diagram of the present invention, and the present invention supports easy and rapid on-site work without checking a filmed image through a monitor, etc. by outputting the same projection image as that of a field of view according to characteristics of an angle of view of a surveillance camera 200 for various purposes when the surveillance camera 200 is installed or repaired.

Figure 2:
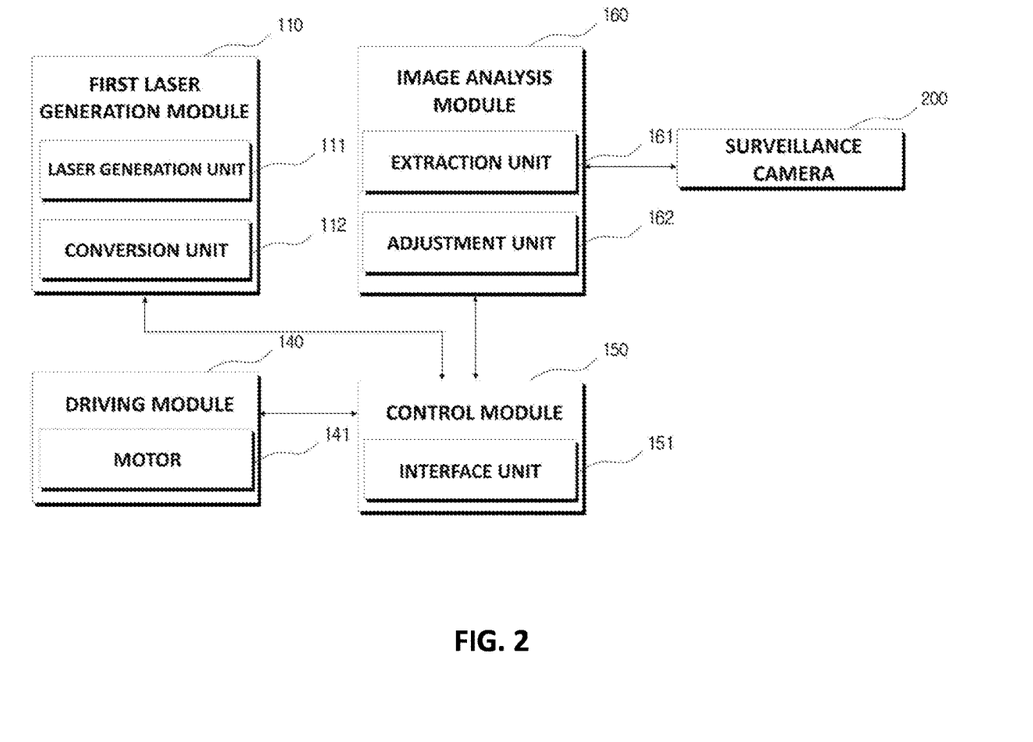
FIG. 2 is a block diagram illustrating a configuration and a connection relationship according to a first embodiment of the present invention.

FIG. 2 is a block diagram illustrating a configuration and a connection relationship according to a first embodiment of the present invention. In the first embodiment of the present invention, a first laser generation module 110, an optical module 130, a driving module 140, a control module 150, and an image analysis module 160 are provided as components built in a body 100 installed together with the surveillance camera 200.

The body 100 is installed to be adjacent to the top, bottom, left and right sides of the surveillance camera 200 so as to output a projection image in the same direction as a filming direction of the surveillance camera 200, and a series of components to be described later are housed therein. At this time, the body 100 needs to be integrally configured according to characteristics of the angle of view of the surveillance camera 200 or provided with means so that a direction is not changed due to an external force or an unintended factor in a state where a position of the projection image indicating the field of view is set.

The first laser generation module 110 is configured to generate spot laser light through an LED emitting light of a set wavelength band, and may be configured by applying various laser generation devices including a commercial laser pointer.

Figure 3:
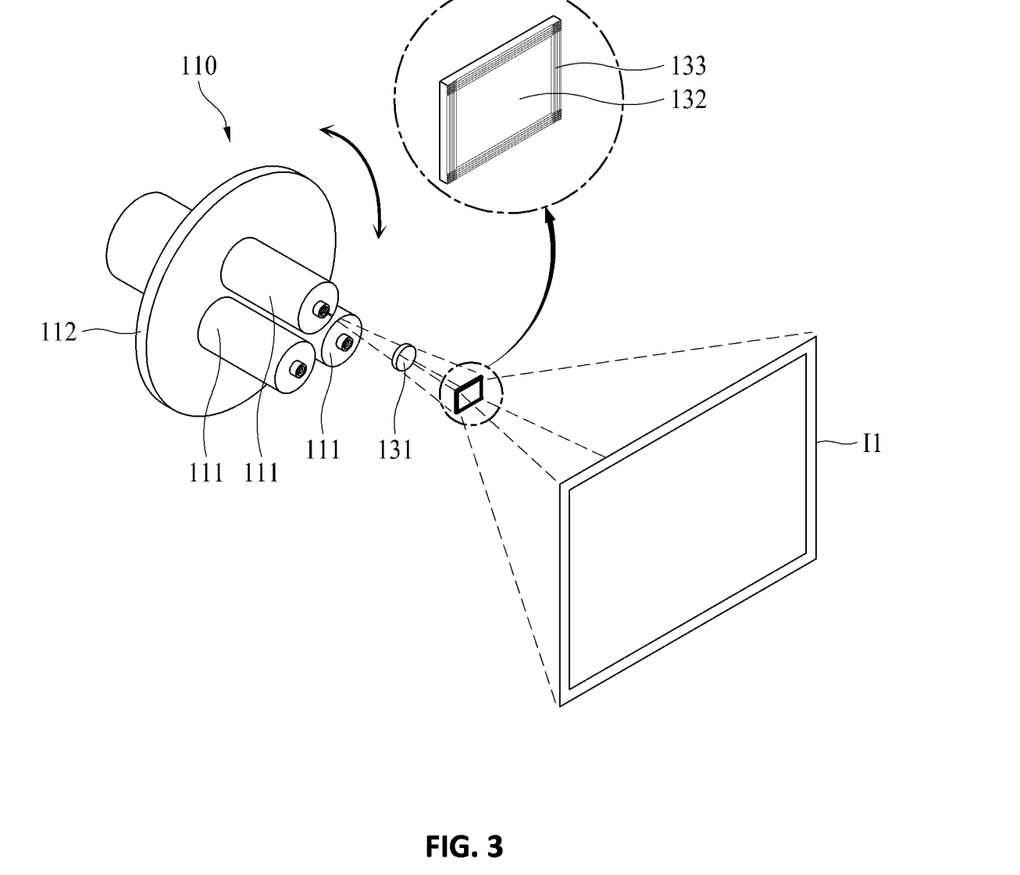
FIG. 3 is a first structural diagram according to the first embodiment of the present invention.
Figure 4:
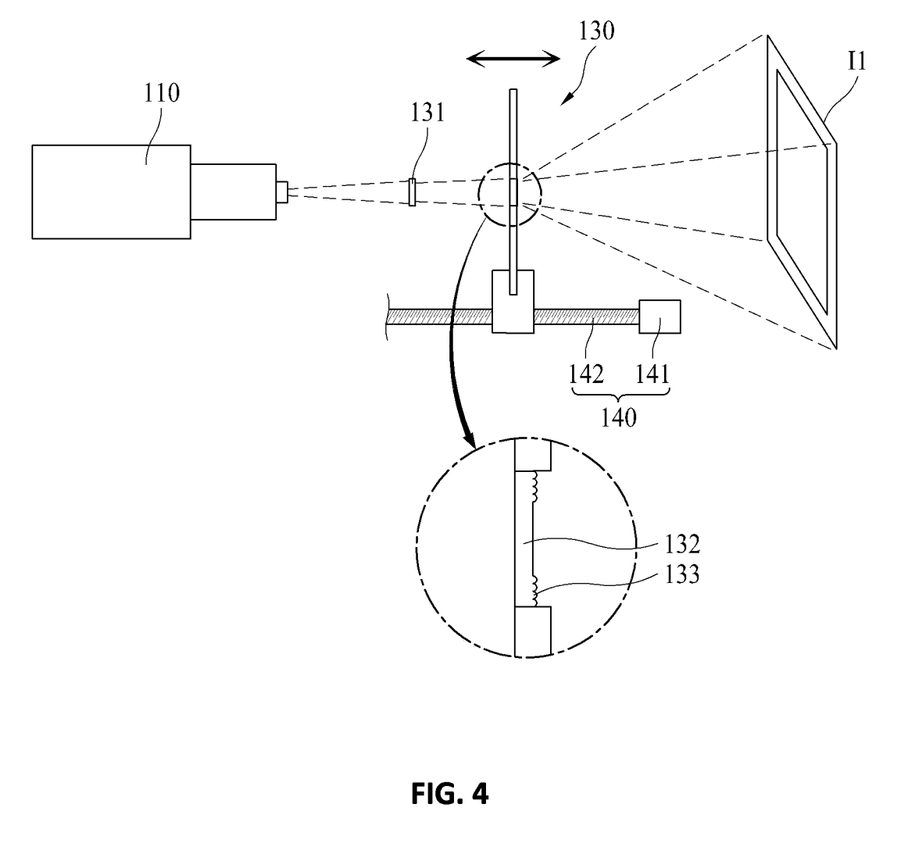
FIG. 4 is a second structural diagram according to the first embodiment of the present invention.

FIG. 3 is a first structural diagram according to the first embodiment of the present invention, and FIG. 4 is a second structural diagram according to the first embodiment of the present invention.

In the present invention, a projection image may be generated by selectively applying lasers having various wavelengths and colors according to an installation environment. To this end, the first laser generation module 110 may include a plurality of laser generation units 111 to which color filters of set colors are applied and LEDs emitting light in different wavelength bands are applied, and a conversion unit 112 that moves the laser generation units 111 within a set range and converts the color of emitted light.

It is preferable to use green light as the color of the laser. However, an appropriate laser light color may be selected since identification may be difficult depending on the color-side filming background around a place where the surveillance camera 200 is installed, indoor/outdoor, day/night, ambient brightness, etc.

To this end, the plurality of laser generation units 111 to which filters and LEDs emitting light of set colors and wavelength bands are applied may be provided and selectively used. In the first embodiment of the present invention, as a preferred embodiment, a state in which three laser generation units 111 for generating red, green, and blue laser light, respectively, are formed is illustrated. The number of provided laser generation units may be appropriately increased or decreased as necessary.

The conversion unit 112 is configured so that a projection image can be generated through laser light of a desired color and wavelength by selecting one of the plurality of laser generation units 111. In an embodiment of the present invention, the conversion unit 112 is configured so that the plurality of provided laser generation units 111 is rotated in a turntable manner, and a position can be adjusted to allow laser light output through the selected laser generation unit 111 to be introduced into the optical module 130 to be described later. The optical module 130 is configured to transform laser light output from the first laser generation module 110 to finally generate a rectangular projection image I1, includes a main optical system 132 for transforming a spot laser, which is a point light source, into a linear light source, and forming the linear light source in a rectangular shape, and outputs the rectangular projection image I1 generated in this way in a filming direction of the surveillance camera 200.

To this end, first, the spot laser light output from the first laser generation module is diffused through a diffusion plate 131. The main optical system 132 basically converts the laser light previously diffused through the diffusion plate into linear laser light through a lenticular lens 133, and lenticular lenses 133 are combined in a rectangular frame shape to generate the rectangular projection image I1.

The lenticular lens 133 converts a point light source into a linear shape, and thus is also referred to as a line lens, and is used to form linear laser light for various purposes by being configured as a rod-shaped microlens having a semi-cylindrical cross section. In the present invention, the lenticular lens 133 is configured in a quadrangular frame shape, and other parts are treated so that light transmittance characteristics deteriorate. In this way, as the diffused light passes, the rectangular projection image I1 is generated, and a field of view of the surveillance camera is displayed.

The driving module 140 is configured to adjust a size of the rectangular projection image I1 generated through the optical module 130 so that the size matches the field of view of the surveillance camera, and the size of the rectangular projection image is adjusted by adjusting a distance between the first laser generation module 110 and the main optical system 132.

To this end, the driving module 140 basically includes a motor 141 and a driving system 142 for controlling the distance between the first laser generation module 110 and the optical module 130 and adjusting the size of the projection image by driving the motor 141.

The motor 141 is a motor driven by an electric method, and in response thereto, the driving system 142 includes a worm gear that converts rotational force of the motor 141 into linear motion and may adjust the distance between the first laser generation module 110 and the optical module 130.

In addition, by applying a linear motor that converts rotational motion into linear motion to the motor 141 to configure the driving module 140, the distance between the first laser generation module 110 and the optical module 130 may be precisely adjusted, and the size of the projection image I1 may be adjusted.

The control module 150 is configured to control the first laser generation module 110 and the motor 141 in response to the angle of view of the surveillance camera 200, and to make the field of view of the surveillance camera 200 coincide with the size of the projection image I1.

To this end, an interface unit 151 is provided on one side of the body 100 to allow an operator to turn on and off the first laser generation module 110, input information about the angle of view of the installed surveillance camera 200, and operate the conversion unit 112 so that a selected color among a plurality of colors may be output when the plurality of laser generation units 111 is configured.

That is, the body 100 is manufactured and set in a state where the projection image output through the optical module 130 is basically set to match the filming direction of the surveillance camera, and the field of view is closely related to the angle of view of the surveillance camera 200. Therefore, the size of the rectangular projection image is adjusted in response to characteristics of the angle of view of the surveillance camera 200 and made to coincide with the field of view of the surveillance camera.

To this end, the control module 150 is configured to control the motor in response to information about the angle of view input through the interface unit 151 in a state where a control value of the motor 141 of the driving module 140 is set so that the size of the rectangular projection image I1 is adjusted using a table or a calculation formula prepared in advance according to the characteristics of the angle of view of the surveillance camera, and to make the output rectangular projection image I1 coincide with the field of view.

The image analysis module 160 is configured to analyze an image in conjunction with the surveillance camera 200 and accurately adjust the size of the rectangular projection image I1, and includes an extraction unit 161 and an adjustment unit 162 as detailed components.

The extraction unit 161 is configured to analyze an image filmed by the surveillance camera 200 and extract a projection image from the image. That is, a signal according to filming of the surveillance camera 200 is obtained and analyzed to extract a rectangular projection image from the image. As the generated projection image I1 has a selected color and light, the image may be easily extracted using signal characteristics thereof.

Figure 5:
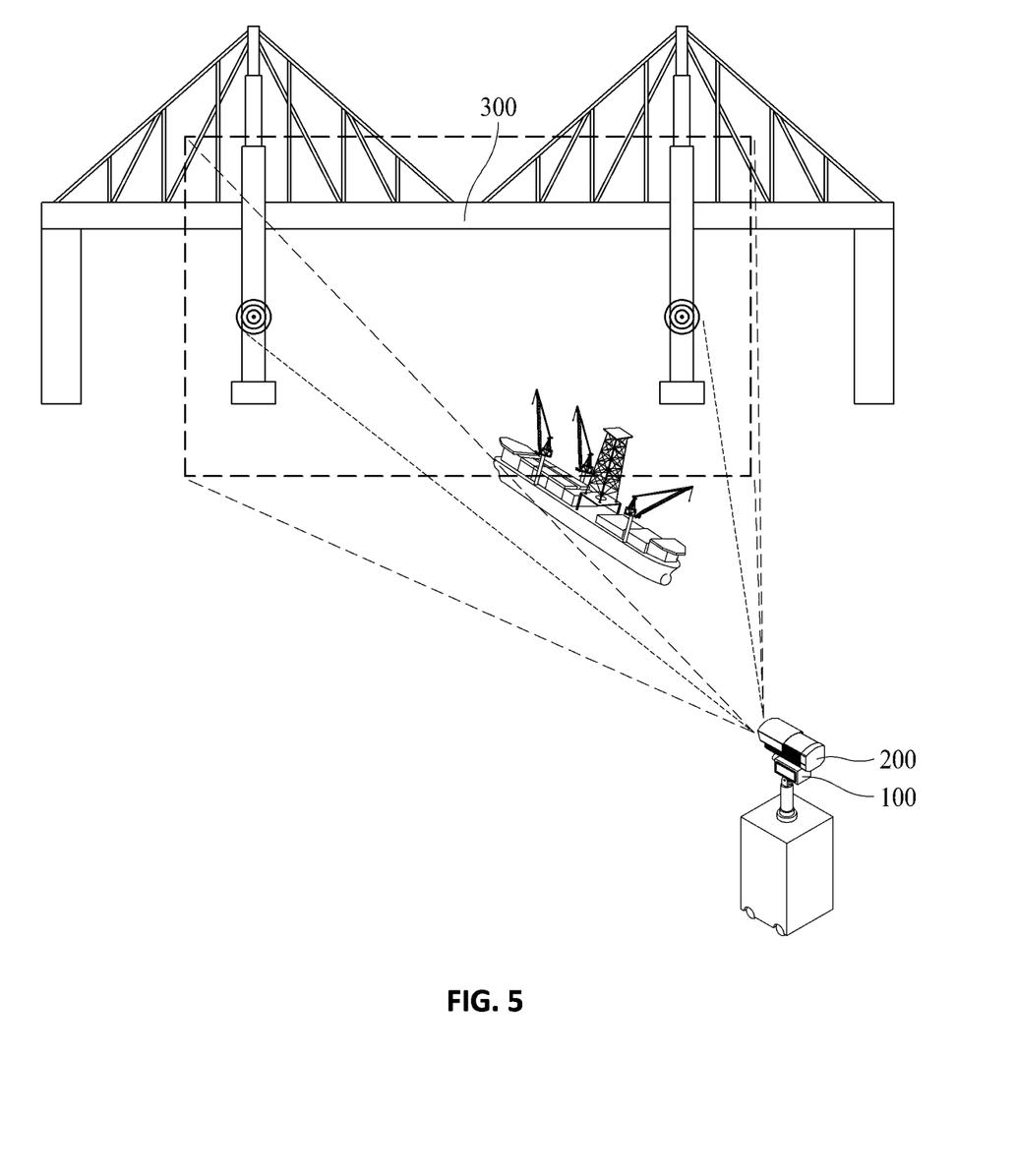
FIG. 5 is a conceptual diagram according to a second embodiment of the present invention.

The adjustment unit 162 is configured to adjust the size of the projection image I1 extracted through the extraction unit 161 to fit to an edge of the filmed image in conjunction with the control module 150. That is, the motor 141 is controlled in conjunction with the control module 150 so that the rectangular projection image extracted through actual analysis of the filmed image of the surveillance camera 200 may be located at an outer edge of the filmed image corresponding to the actual field of view. In this way, it is possible to make the projection image in the filmed image coincide with the actually displayed projection image, and to display the accurate field of view. FIG. 5 is a conceptual diagram according to a second embodiment of the present invention, and the surveillance camera of the present invention may be utilized for the purpose of monitoring various facilities. In particular, the surveillance camera may be effectively applied to a monitoring system that can film and monitor nearby bridge facilities and tunnel facilities, and prevent accidents such as collisions between transportation means such as vehicles and ships and the facilities.

Figure 6:
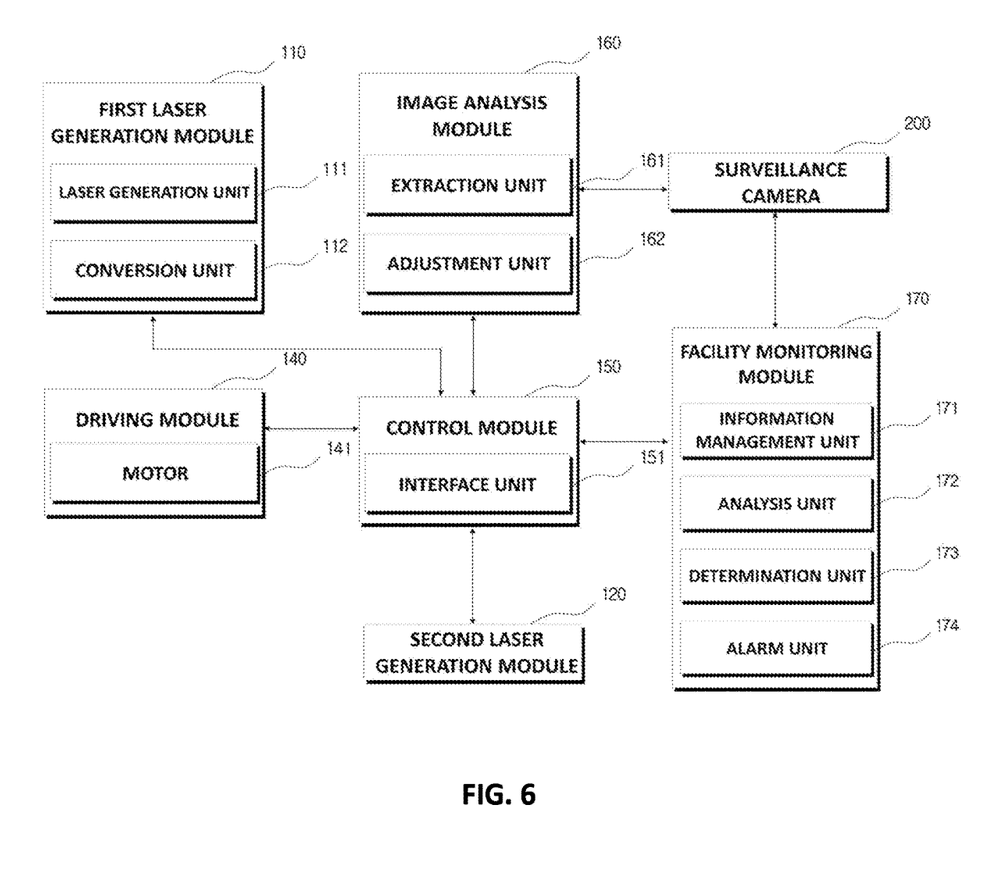
FIG. 6 is a block diagram illustrating a configuration and a connection relationship according to the second embodiment of the present invention.
Figure 7:
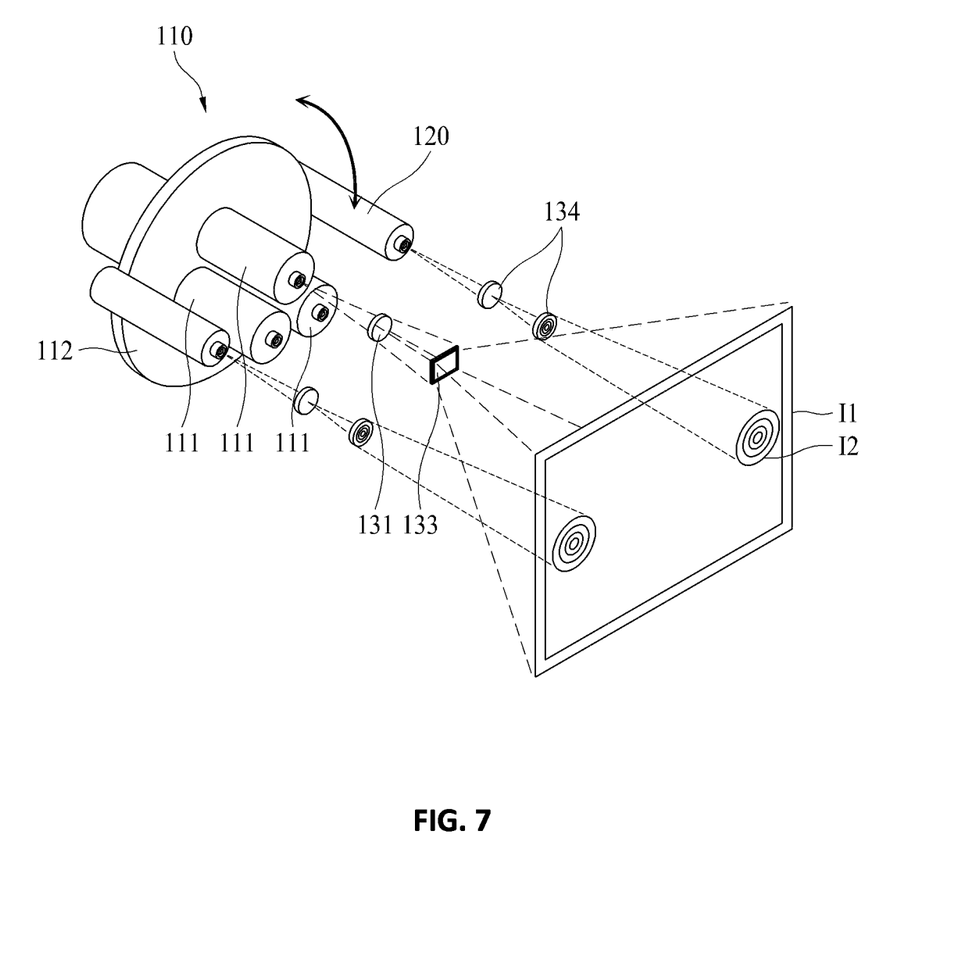
FIG. 7 is a conceptual diagram according to the second embodiment of the present invention.

FIG. 6 is a block diagram illustrating a configuration and connection relationship according to the second embodiment of the present invention, and FIG. 7 is a conceptual diagram according to the second embodiment of the present invention. In the second embodiment of the present invention, a second laser generation module 120 and a facility monitoring module 170 are added to the first embodiment described above as components for monitoring and protection to prevent collision accidents of various facilities.

The second laser generation module 120 is configured to generate spot laser light through an LED that emits light in a wavelength band set separately from the first laser generation module 110, and is configured to generate an optical image I2 of a set pattern independent from the aforementioned rectangular projection image.

Since the optical image I2 having the set pattern is eventually output in the same direction as that of the rectangular projection image I1, the second laser generation module 120 is installed on the side of the first laser generation module 110 so as to output spot laser light in the same direction as that of the first laser generation module 110.

Correspondingly, the optical module 130 further includes an auxiliary optical system 134 for changing laser light of the second laser generation module 120 to the optical image I2 of the set pattern and outputting the image within the field of view of the surveillance camera 200.

An optical image created through the auxiliary optical system 134 may be configured in various forms by applying a commercial laser light conversion method. In the second embodiment of the present invention, the auxiliary optical system 134 in which a plurality of lenticular lenses 133 is formed in concentric circles is configured so that the optical image I2 can be formed to have a pattern set in a plurality of concentric circles after a spot laser output from the second laser generation module 120 is diffused.

The facility monitoring module 170 is configured to photograph and monitor a facility in conjunction with the surveillance camera 200 and output a visual warning using the optical image I2 of the set pattern, and includes an information management unit 171, an analysis unit 172, a determination unit 173, and an alarm unit 174 as detailed components.

At this time, the facility monitoring module 170 may target various facilities. The second embodiment of the present invention illustrates technology targeting a maritime bridge facility 300 to film and monitor the sea near the bridge facility 300 and capable of preventing a collision accident with the bridge facility 300 according to a real-time position and movement situation of a ship in transit.

The information management unit 171 is configured to store facility information including a type and standard of a facility to be monitored. The facility information is a shape and standard of a bridge to be monitored, and may be design values such as a full length, that is, a bridge length, the number and locations of substructures (piers) supporting the bridge, an interval therebetween, that is, a span, and a girder height, which is a distance between a superstructure for bridge passage and a sea level. Such facility information allows a standard of a ship that can pass between piers or a possibility of collision of a passing ship to be determined in detail.

The analysis unit 172 is configured to analyze an image of the surveillance camera 200 to identify a moving object and track a location and movement path in real time.

In order to facilitate identification of the moving object, a preprocessing process of removing factors that hinder identification of the moving object represented by the ship through preprocessing of a filmed image may be performed. The factors may be an atmospheric condition such as snow or rain, reflected light due to reflection of sunlight off the sea surface, and ripples that occur depending on the sea conditions.

In the case of such reflected light, there is a pattern according to a location and time zone of the sun and a filming module, which may be solved by adjusting an HSV channel corresponding thereto and applying an optical filter. In addition, filtering according to effects of snow, rain, and ripples filmed in the image may be solved through a known image preprocessing algorithm.

Depending on the installation location of the surveillance camera 200, it is necessary to first divide sky and sea areas based on the horizon to detect an object in preprocessing for detecting presence of a sea object, and contour detection using a canny edge detector may be used to detect a contour of a horizontal line.

Then, noise other than the contour of the sky and sea may be detected due to noise factors such as waves and sunlight, and such noise may be mitigated through a filter. That is, the filtered input image is less affected by noise, and the contour of the object (ship) including the horizontal line is detected. The filter blurs the contour of the image, and blurring filters such as Mean, Gaussian, and Median may be used. Each filter generates a filter kernel of a two-dimensional matrix, and may remove noise by performing a convolution operation on an image for application. As the size of the filter kernel increases, the filter strength increases. However, the amount of computation increases. Therefore, the filter is used according to the environmental conditions.

In order to identify the ship from the preprocessed image, a basic shape and color of the ship floating on the sea may be basically used. In other words, since there are basic shapes and colors in the case of merchant ships, fishing ships, government ships such as warships, recreational ships, barges, and other special ships for construction, it is possible to verify whether or not an object is a ship using the shapes and colors. In addition, by verifying whether a position is maintained or moving, it is possible to distinguish a ship from a buoy, etc.

It is obvious that the ship may not move without driving of a power means. However, without anchoring, the ship moves under the influence of currents and winds. Further, even in the anchored state, heading changes inevitably occur due to rotation. Therefore, ship identification is not difficult.

To this end, the analysis unit 172 may include a preprocessing algorithm for analyzing the amount of color change of the input image, and divides a region of the input image to calculate an average number of pixels of the region. It is possible to use a method of comparing a difference in the color change amount of the average number of pixels to detect a sea region and detecting an object region existing in the sea region.

In addition, the identified ship is tracked, and movement information is generated in real time. Basically, when a ship is navigating or even in an anchored state, an accident risk may occur due to strong winds or currents pushing the ship. Therefore, after assigning a management code to the identified ship, a change in position is generated as movement information through time-by-time image frame comparison.

The determination unit 173 is configured to calculate the size of the moving object and generate collision prediction information based on the facility information and the movement path.

In particular, a possibility of collision with a bridge increases depending on the height of the ship, and thus it is preferable to calculate the height of the ship identified through image analysis of the surveillance camera 200. Basically, the height of the ship may be calculated through image analysis and geometric approaches. That is, in a state in which a distance value of the surveillance camera 200 is recognized based on the sea level where the ship is located, coordinates in the image may be used to calculate a distance from the ship using origin coordinates at which the filming module is installed and coordinate values of the ship, coordinates of the sea level where the sea level meets a line forming a shooting angle of the filming module, and a sea level distance. Further, the height of the ship may be calculated using these values.

In addition, in the case of ships of internationally accepted standards, for example, in the case of merchant ships, the type may be identified through detailed analysis of the image. In this way, an approximate height range may be obtained. For example, in the case of very large tankers (VLCC) and very large bulk carriers (VLOC), as well as handysize cargo ships such as CAPE size, Panamax, and Handymax, the ships may be identified through deck crane and ship width or length analysis, night light analysis, etc., and height information of the ships collected using previously released ship specification information may be applied.

At this time, since a waterline, which changes according to the cargo load, is distinguished by color, it is possible to separately calculate a height submerged in water and a height exposed above the sea level by analyzing heights of the sea level and the waterline.

The determination unit generates collision prediction information based on the calculated size of the moving object, the facility information of the information management unit 171, and the movement path of the object tracked through the analysis unit 172.

It is possible to calculate a predicted path by accumulation of the real-time movement path of the ship, and to basically determine a possibility of collision using the height of the ship calculated above and the height of the bridge in the facility information. In addition, even when the height of the ship is lower than that of the bridge superstructure, and thus the ship can pass through, a possibility of collision with the pier may be determined based on locations and spacing of piers and the subdivided expected movement path of the ship.

The alarm unit 174 is configured to reflect a determination result of the determination unit 173 and output an optical image of a pattern set through the auxiliary optical system 134 to the outside of the facility. As the optical image of the set pattern is displayed on the outside of the facility, the optical image may be visually recognized from the side of the transportation means such as the ship, and this recognition effect may be increased by blinking the image or changing a position width.

According to the present invention, it is possible to rapidly and accurately check a shooting area of the surveillance camera in the field without communication between an installation site of the surveillance camera and a location for image monitoring. In this way, it is possible to shorten a construction period for installation of the surveillance camera and thereby reduce economic loss, and to improve the working conditions in various poor installation environments.

In addition, in terms of protecting various facilities, it is possible to prevent various accidents by intentionally outputting that the surveillance camera is filming and monitoring, and to achieve effective protection of facilities having risk of collision accidents due to dams and transportation means such as bridges.

The right to the invention is not limited to the embodiments described above and is defined by the claims. Further, it is apparent that a person of ordinary skill in the art can make various modifications and adaptations within the scope of the claims set forth in the claims.

What is claimed is:

1. A device for checking a field of view of a surveillance camera, the device comprising:
   a first laser generation module configured to generate spot laser light through an LED that emits light in a set wavelength band;
   a second laser generation module configured to generate spot laser light through an LED that emits light in a set wavelength band;
   an optical module including a diffusion plate configured to diffuse the spot laser light, a main optical system configured to generate a rectangular projection image by combining lenticular lenses, each of which converts diffuse laser light into linear laser light, in a rectangular frame shape, and an auxiliary optical system configured to change laser light of the second laser generation module to an optical image of a set pattern, and to output the image within the field of view of the surveillance camera, the optical module outputting the projection image and the optical image of the set pattern in a filming direction of the surveillance camera;
   a driving module including a motor and a driving system configured to adjust a distance between the first laser generation module and the optical module and adjust a size of the projection image by driving the motor;
   a control module configured to control the first laser generation module and the motor in response to an angle of view of the surveillance camera, and to make the field of view of the surveillance camera coincide with a location and a size of the projection image; and
   a facility monitoring module including an information management unit in which facility information including a type and standard of a facility to be monitored is stored, an analysis unit configured to analyze an image of the surveillance camera to identify a moving object and to track a location and a movement path in real time, a determination unit configured to calculate a size of the moving object and to generate collision prediction information based on the facility information and the movement path, and an alarm unit configured to reflect a determination result of the determination unit and to output an optical image of a pattern set through the auxiliary optical system to an outside of a facility.

2. The device according to claim 1, further comprising an image analysis module including an extraction unit configured to analyze an image filmed by the surveillance camera, and to extract a projection image from the image, and an adjustment unit configured to adjust a size of the extracted projection image to fit to an edge of the filmed image in conjunction with the control module.

3. The device according to claim 1, wherein the first laser generation module includes:
   a plurality of laser generation units to which color filters of set colors are applied and LEDs emitting light in different wavelength bands are applied; and
   a conversion unit configured to move the laser generation units within a set range and convert a color of emitted light.

* * * * *